(No Model.) 8 Sheets—Sheet 1.
R. G. WARD.
ENVELOPE MACHINE.
No. 423,646. Patented Mar. 18, 1890.
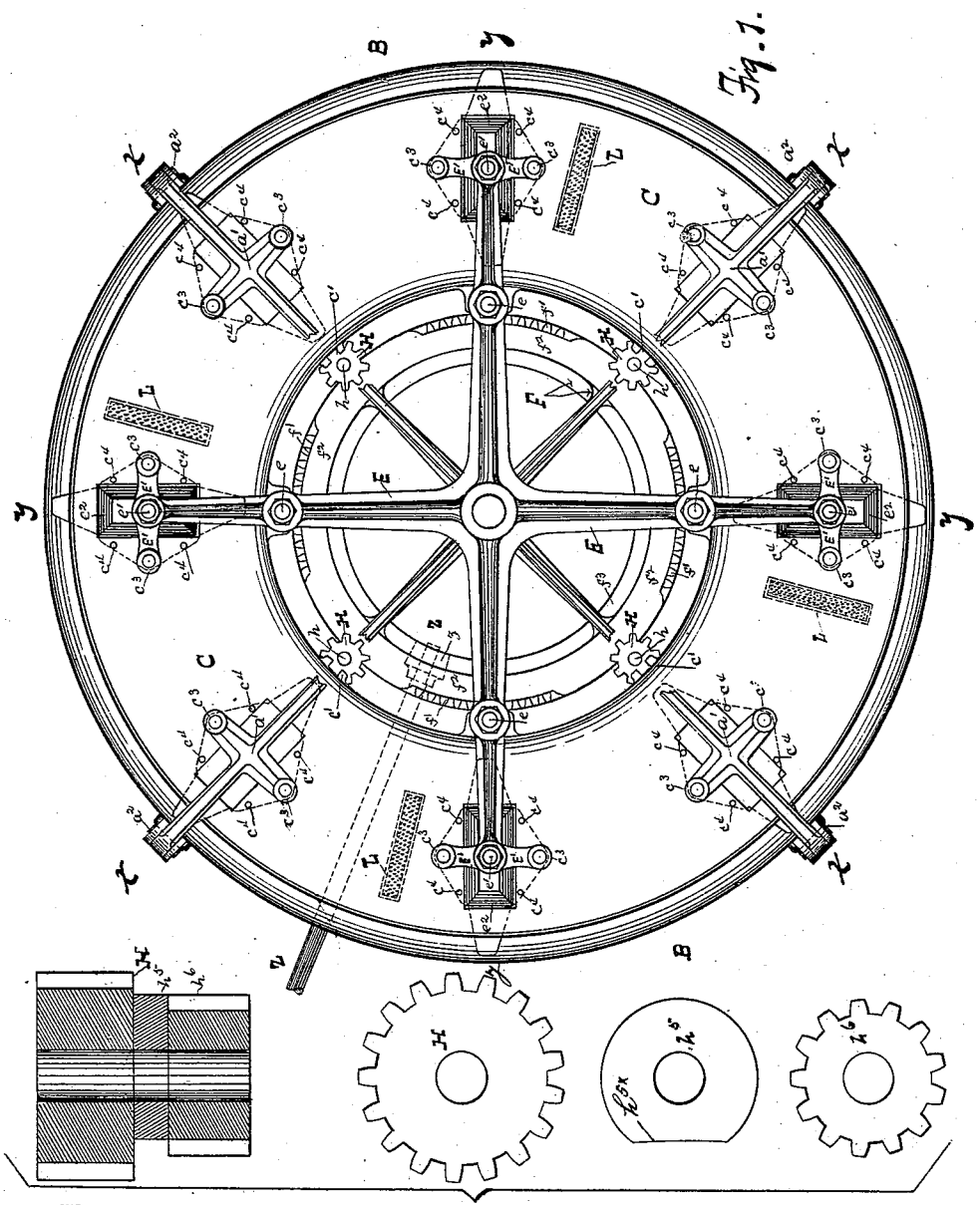
WITNESSES:
L. C. Hills,
H. Sutherland.
INVENTOR:
R. G. Ward
BY E. B. Stockling
ATTORNEY.

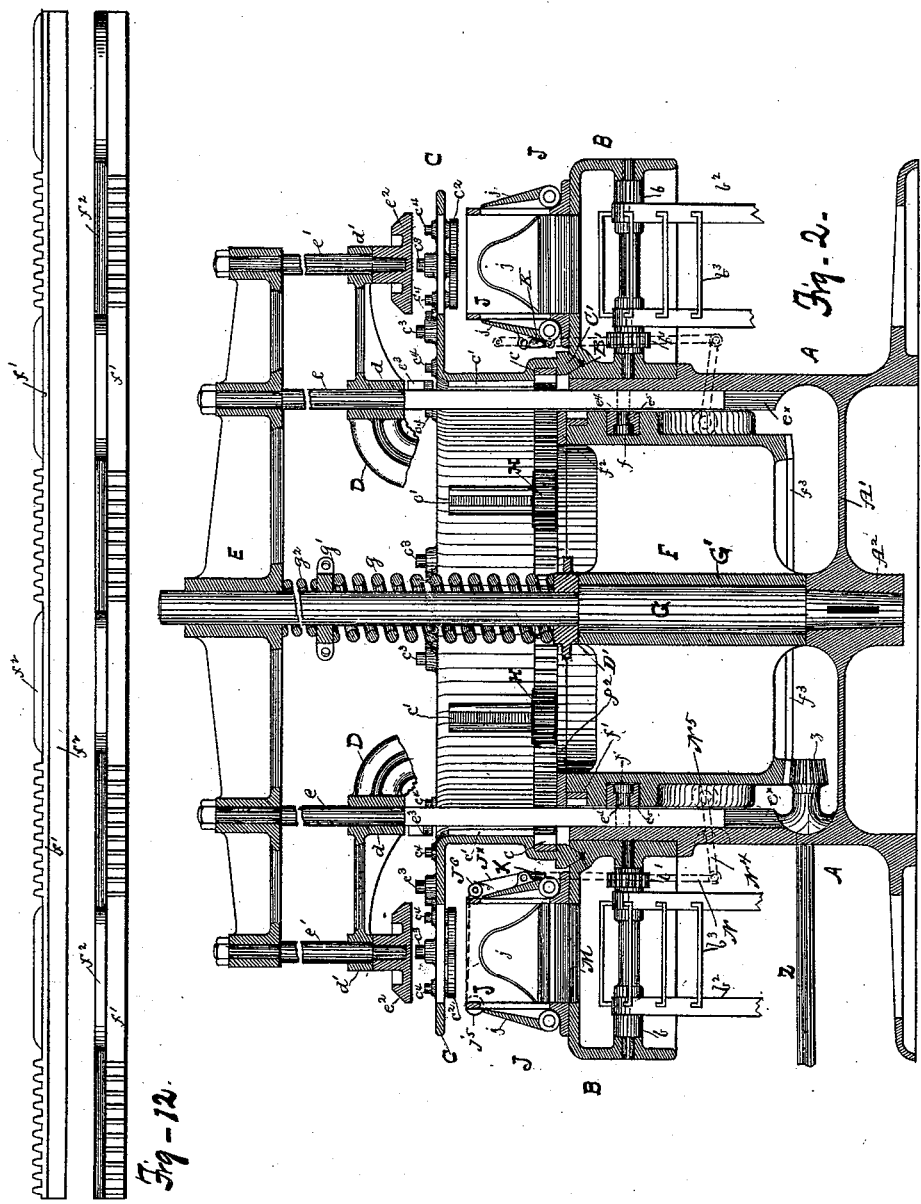

(No Model.)  8 Sheets—Sheet 3.
R. G. WARD.
ENVELOPE MACHINE.
No. 423,646.   Patented Mar. 18, 1890.
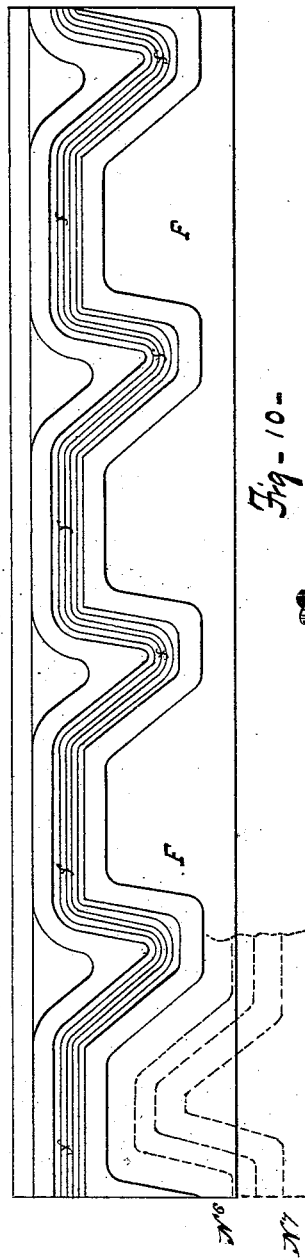
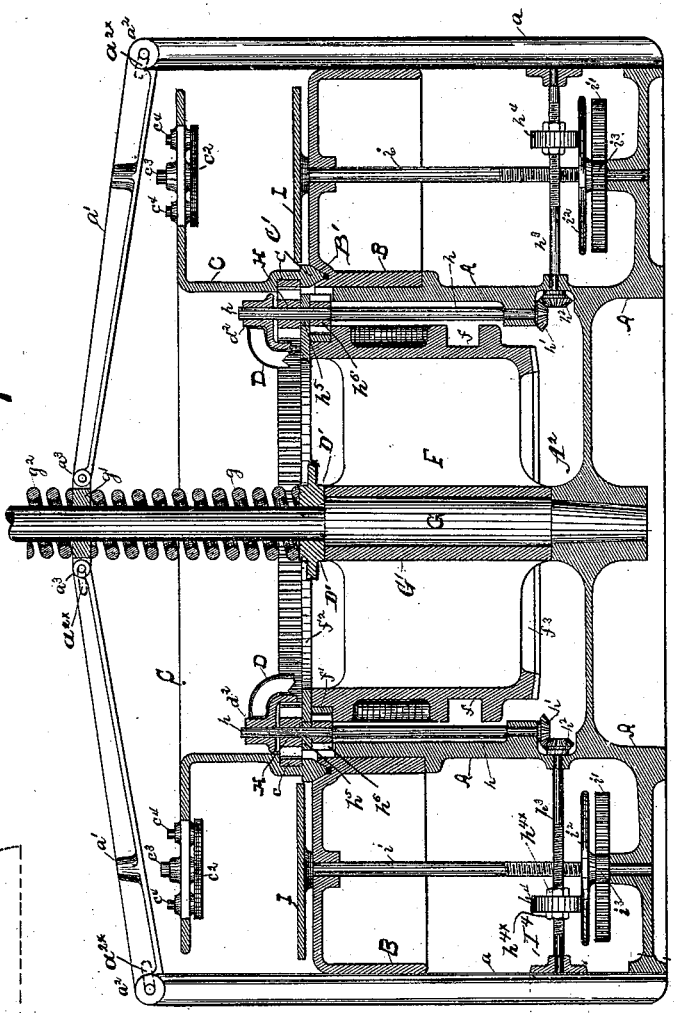
WITNESSES:
L. C. Hill
H. Sutherland
INVENTOR:
R. G. Ward
BY E. B. Stocking
ATTORNEY.

(No Model.) 8 Sheets—Sheet 4.

R. G. WARD.
ENVELOPE MACHINE.

No. 423,646. Patented Mar. 18, 1890.

WITNESSES:
L. C. Hills
H. Sutherland

INVENTOR:
R. G. Ward
BY E. B. Stocking
ATTORNEY.

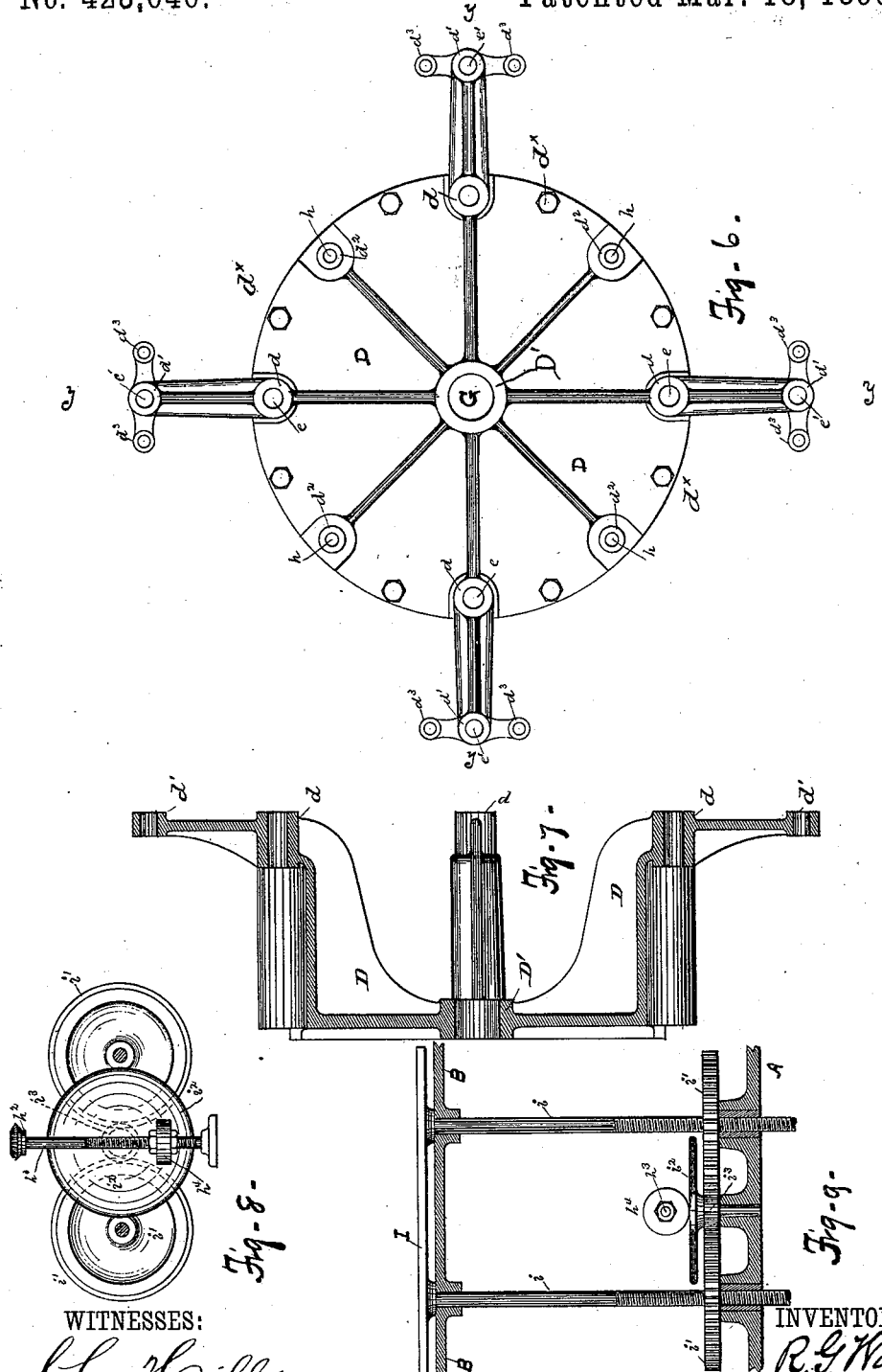

(No Model.) 8 Sheets—Sheet 6.
R. G. WARD.
ENVELOPE MACHINE.
No. 423,646. Patented Mar. 18, 1890.
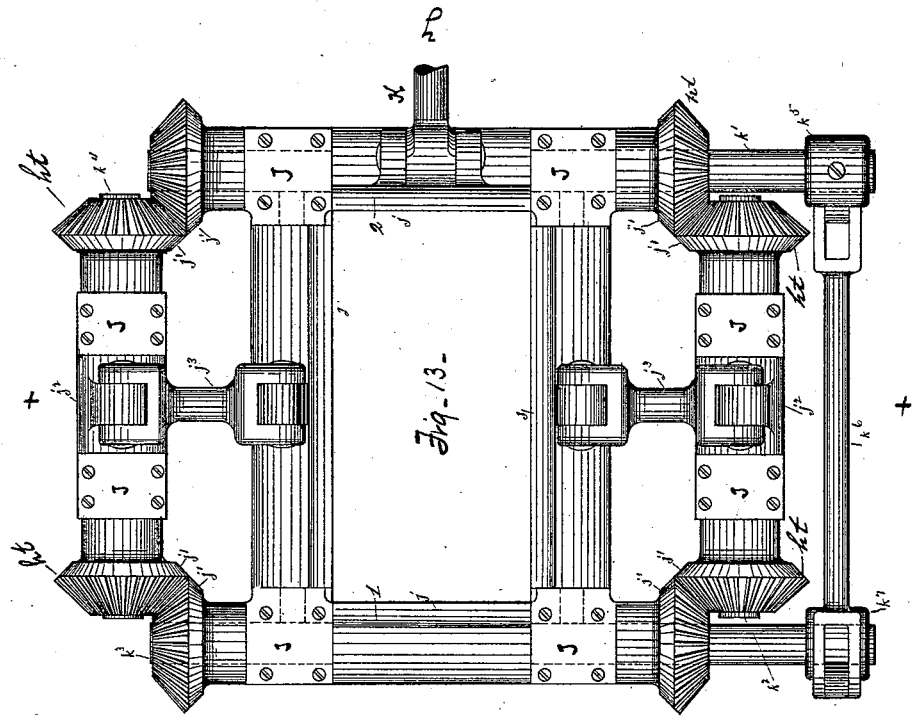
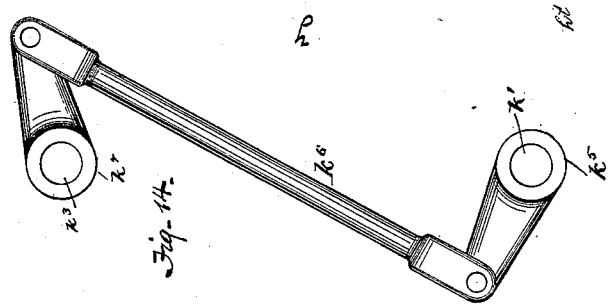
WITNESSES:
L. C. Hills
H. Sutherland
INVENTOR:
R. G. Ward
BY E. B. Stocking
ATTORNEY.
N. PETERS, Photo-Lithographer, Washington, D. C.

(No Model.) 8 Sheets—Sheet 7.
R. G. WARD.
ENVELOPE MACHINE.
No. 423,646. Patented Mar. 18, 1890.
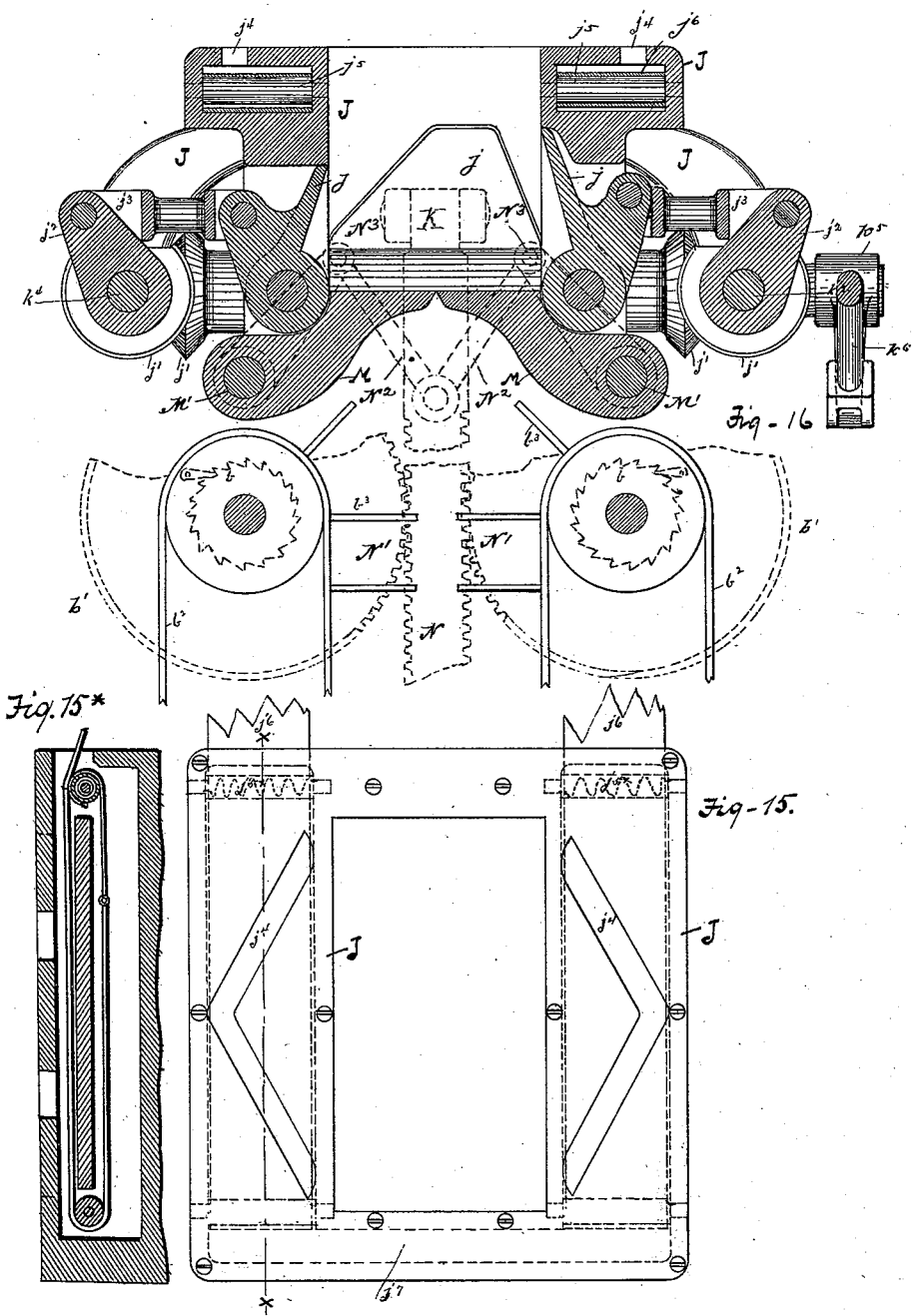
WITNESSES:
INVENTOR:
R. G. Ward
BY E. B. Stocking
ATTORNEY.

(No Model.) 8 Sheets—Sheet 8.
R. G. WARD.
ENVELOPE MACHINE.
No. 423,646. Patented Mar. 18, 1890.
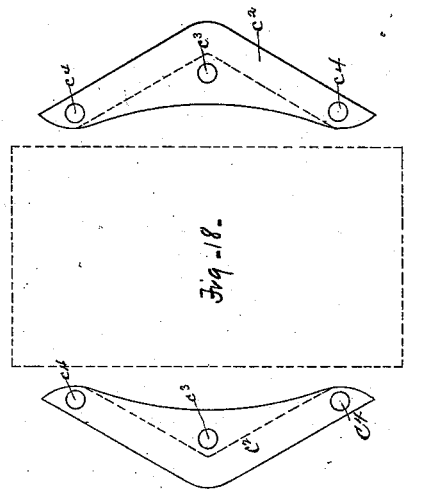
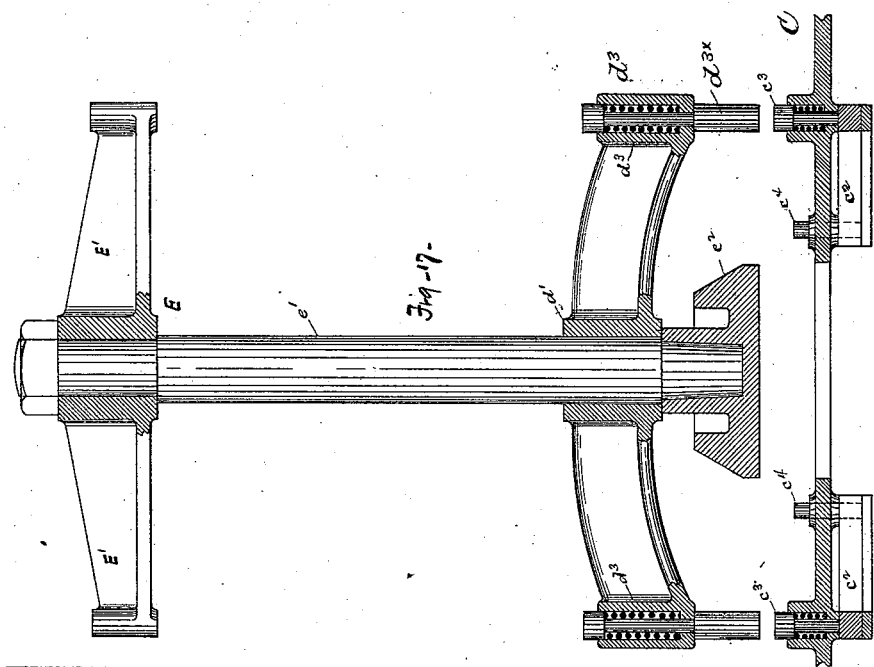
WITNESSES:
S. C. Hills
H. Sutherland
INVENTOR:
R. G. Ward
BY E. B. Stocking
ATTORNEY

UNITED STATES PATENT OFFICE.

RANDOLPH G. WARD, OF BALTIMORE, MARYLAND.

ENVELOPE-MACHINE.

SPECIFICATION forming part of Letters Patent No. 423,646, dated March 18, 1890.

Application filed June 9, 1888. Serial No. 276,661. (No model.)

*To all whom it may concern:*

Be it known that I, RANDOLPH G. WARD, a citizen of the United States, residing at Baltimore, in the State of Maryland, have invented certain new and useful Improvements in Envelope-Machines, of which the following is a specification, reference being had therein to the accompanying drawings.

This invention has relation to envelope-machines, and more particularly to that class of such machines which are adapted to operate upon more than one blank—that is, to feed and fold at one time or during the operation of the machine more than a single blank.

The objects and advantages of the invention will appear in the following description, and the novel features thereof will be particularly pointed out in the claims.

Figure 4:
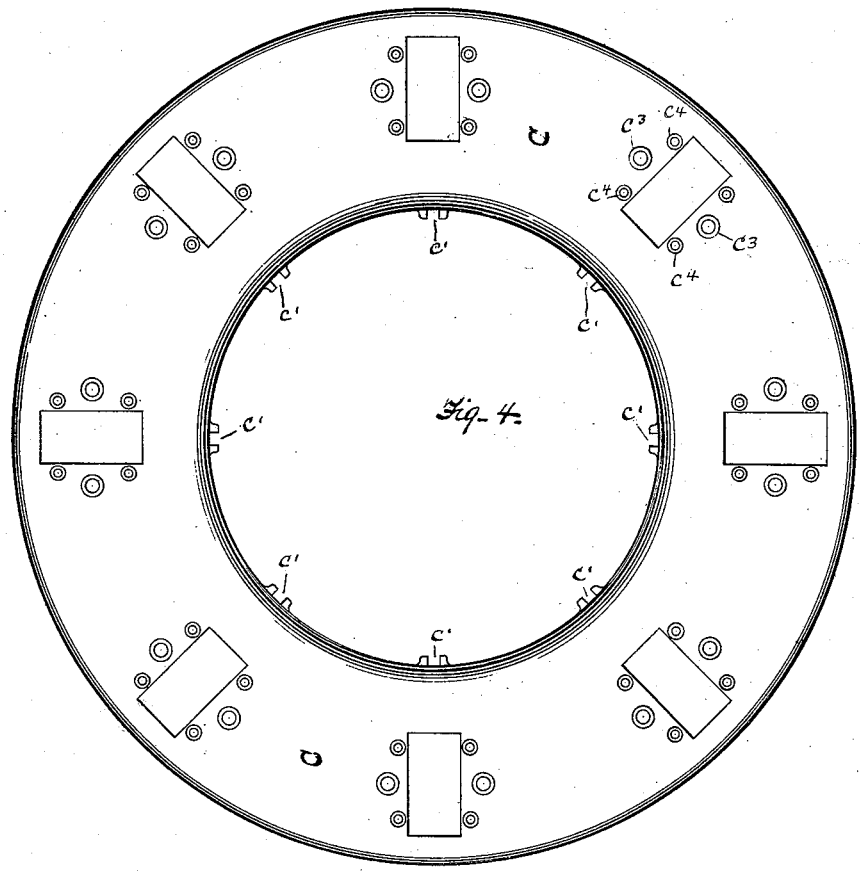
Figure 5:
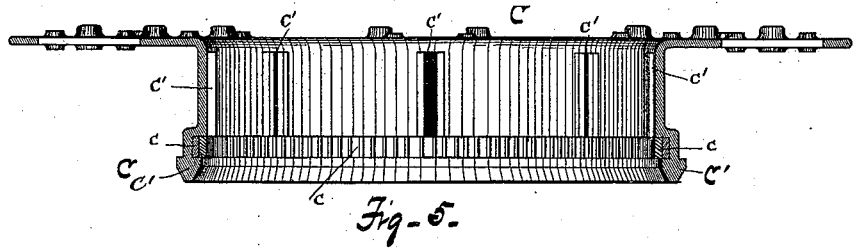

Referring to the drawings, Figure 1 is a plan of an envelope-machine embodying my invention, the guide-frame being removed and the picker-actuating levers broken away to disclose interior mechanism. Fig. 2 is a central vertical section on the lines $y$ of Fig. 1, the guide-frame being partially removed, as are also the picker-operating levers. Fig. 3 is a central vertical section taken on the lines $x$ of Fig. 1, the cross-head carrying the folding-pistons being removed and the guide-frame being also but partially shown, so as to disclose other parts. Fig. 4 is a plan of the blank feeder or carrier as it appears without any of its attachments or adjacent parts. Fig. 5 is a diametrical vertical section of the same and its gear. Fig. 6 is a plan of the guide-frame. Fig. 7 is a central vertical section of said guide-frame. Fig. 8 is a plan of the gearing employed for adjusting the blank-supporting tables. Fig. 9 is a side elevation of said gearing and table, the frame-work being shown in section. Fig. 10, Sheet 3, is a diagram of the main cam laid out or extended in a flat position. Fig. 11, Sheet 1, is a longitudinal vertical section of a compound gear and end elevations of the larger gear, the collar and the smaller gear constituting the said compound gear. Fig. 12, Sheet 2, is a side elevation and plan of a rib and mutilated rack employed. Fig. 13 is a plan, on an enlarged scale, of the folding-box mechanism employed for folding the flaps of the envelopes. Fig. 14 is a plan of the connecting-rod and cranks shown at one side of Fig. 13. Fig. 15 is a plan of the upper portion of the frame-work of the folding-box, with gumming mechanism shown in dotted lines. Fig. 16 is a substantially central vertical section of the folding-box and its folding mechanism, together with details of the endless carriers for transferring the completed envelopes from the machine. Fig. 17 is a central vertical section of the cross-head, folding-piston, and guide-frame and the adjacent portions of the blank-feeder, the section being taken on lines at right angles to that shown in Fig. 2. Fig. 18 is a plan of the gum-pickers, showing the relative location of the folding-piston and the spring-pistons on which the pickers are mounted. Fig. 15$^\times$ is a vertical section on the line $x\ x$ of Fig. 15.

Like letters of reference refer to like parts in all the figures of the drawings.

A represents the main portion of the frame of the machine; and it consists, essentially, of a cylinder provided with broad flanges to give it a suitable stable foundation, and with a web merging in a hub or boss $A^2$, in which is keyed or otherwise rigidly secured a vertical spindle G.

As will hereinafter appear, the cylindrical form of the frame-work, together with its annular table, is admirably adapted for the reception and co-operation of the various mechanisms employed whether the spindle be fixed or, as would be desirable in some instances, movable, either vertically or rotary, to carry devices for any purpose. I therefore do not consider the rigidly-connected spindle employed in this particular machine as a limiting feature of my invention so far as novel features of construction in the frame-work are concerned.

At the upper portion of the body of the frame, and surrounding the same, is mounted (or it may be formed as a part thereof—that is, integrally) a table B, on and in which the several folding blank-supporting and envelope-delivering mechanisms are located and arranged. As many of said mechanisms may be provided as desired. In this instance, however, four sets of folding and of blank-supporting mechanisms are provided, and the parts of the machine are relatively timed to adapt them to that number of the specified mechanisms.

The blank-feeder C consists of a cylinder, which in this instance is at one edge C' fitted to travel in a groove B', formed in the table B, the same extending completely around, whereby the blank-feeder may be rotated in said groove as a track. The upper end of the cylindrical body is provided with a comparatively broad flange projecting over the bed B of the machine. On the inner surface of the cylindrical portion of the feeder there is secured or formed, as desired, gearing $c$, which extends completely around the cylinder. Vertical ribs, grooves, or guiding-tracks $c'$ are formed at intervals on the interior of the feeder-cylinder, with which the V-shaped projections $e^3$ co-operate to cause exact registration of adjacent movable parts of the machine. Along the under surface of the blank-feeder C, and at intervals, (in this instance one-eighth of its circumference,) are arranged pickers $c^2$, each of which (see Fig. 17) is connected with the feeder by spring-pistons $c^3$ and by guiding-pins $c^4$, so that when operated by adjacent parts said pickers may be brought into contact with suitable gumming mechanisms and with a pile of blanks.

D represents the guiding-frame, the function of which is to guide the folding-pistons and the mechanism employed for giving them movement. The frame D is arranged within the feeder-cylinder C. The frame D has four arms which extend over the feeder C and terminate in guide eyes or bearings $d'$ for the rods $e'$ of the folding-pistons $e^2$ and for the rods $e$, which support and give motion to the cross-head E, the latter being mounted for reciprocation upon the spindle G. The guide-frame D has also bearings $d^2$ (see Figs. 3 and 6) for the upper ends of shafts $h$, which are hereinafter described. At the outer ends of the arms $d$ there are formed cross-heads terminating in bearings $d^3$ for spring-pistons $d^{3\times}$, which are arranged to come in contact with the spring-pins $C^3$ of the gummer $C^2$, being depressed by contact of the cross-head E, so that the gum-pickers $c^2$ are forced into the gum-receptacles through openings $j^4$ adjacent to the opening or mouth of the folding box or trunk J. The frame D may be secured to the upper edge of the main frame A by bolts $D^\times$, Fig. 6. The spring $g$ is around the spindle G and between the bottom or table portion of the frame D and the cross-head E, and in this instance a collar $g'$ and secondary spring $g^2$ are interposed between the cross-head and the spring $g$ in order to give a yielding pressure upon the levers $a'$, which are connected at $a^3$ to said collar. These levers are pivotally connected at $a^2$ with standards $a$, arranged around the machine at the outer edges of the table B and the base of the machine. These levers $a'$ are arranged over the plungers $c^3$ of the gum-pickers $c^2$ upon the feeder C. The pivotal connection of the levers $a'$ with either the collar $g'$ or the standards $a$ is rendered loose by slotting, as at $a^{2\times}$, Fig. 3, preferably at the collar, by reason of the curved path of the inner end of the lever.

The functions of the springs described are, regarding the spring $g^2$, to compensate in a measure for the different distances which the inner ends of the levers are required to travel to cause the pickers to reach and take up the blanks of varied thicknesses, it being understood that the blank tables are automatically fed up as the blanks are removed therefrom. The function of the spring $g$ is to relieve the main cam F, hereinafter described, from undue labor in giving motion to the cross-head and the parts carried thereby and to render the movements of all the parts regular.

The blank-table I (see Figs. 3, 8, and 9) is supported upon one or more vertical non-rotatable standards $i$, each of which is threaded along its lower portion and provided with a geared nut $i'$, both of which are driven by a pinion $i^3$, properly connected with a disk $i^2$. Over this disk is arranged a shaft $h^3$, carrying a pulley $h^4$, which is screw-threaded and mounted upon a threaded portion of said shaft $h^3$, set-nuts $h^{4\times}$ serving to retain the disk $i^2$ at any desired point on the shaft $h^3$ and at any desired distance from the center of the disk, whereby the speed of the rotation of said disk may be adjusted in accordance with the required speed at which it is desired that the blank-table should be elevated. The shaft $h^3$ is provided with a miter-gear $h^2$, which meshes with a companion $h'$ on the vertical shaft $h$, the upper end of which, as before described, runs in a bearing $d^2$ in a guide-frame D. A series of these shafts are employed, comprising a number equal to the number of blank-tables in the machine. After the blank-supporting table has been elevated to its highest position it is desirous that some mechanism be provided whereby it may be depressed.

F represents what may be designated as the "main cam" of the machine. It is mounted to rotate upon the spindle G within the cylindrical body portion of the frame-work and upon the hub of boss $A^2$. The cam F is provided with a track or groove $f$, which in this instance, and agreeing with the number of folding mechanisms involved in the machine, is constructed to give four vertical reciprocations to the cross-head E and four intermediate periods of rest to the same. This motion is communicated from the cam by means of the rods $e$, rigidly connected with the cross-head passing through, so as to be guided by the frame D and downwardly inside of the cylindrical portion of the blank-feeder C and into and inside of the cylindrical main portion of the frame of the machine, where suitable guides $e^\times$ are formed for their reception. A pin or bolt $e^4$ (having preferably a friction-roller $e^5$) projects from each rod into the track $f$ of the cam. On the outer surfaces of these rods $e$ the beveled registering blocks or projections $e^3$ are located, so that during downward reciprocations of the rods said blocks are brought into the grooves $c'$, and thus the folding-pistons $e^2$, carried by the cross-head E, are caused to exactly register with the folding-boxes J on the table B. The lower edge of the cam F is provided with a gear $F^3$, whereby the cam may be driven by a pinion $z$, mounted on the main or power shaft Z of the machine. A worm and screw may be substituted for the pinion and gear shown. At the upper edge and around the outside of the cam F is a gear $f'$. This gear is mutilated—that is, it constitutes a circular rack having plain portions and toothed portions, as clearly shown in Fig. 12, and adjacent to the rack is a rib $f^2$.

Now, by reference to Fig. 3, it will be seen that each of the shafts $h$ is provided with a pinion $h^6$, which is adapted to mesh with the toothed portions of the rack $f'$ immediately above the pinion $h^6$, and on the shaft $h$ is a collar $h^5$, and immediately above the collar a larger pinion H. The latter meshes with the gear $c$ on the blank-feeder C.

As thus far described, it will be seen that when motion is imparted to the drive-shaft Z the cam is rotated by the pinion $z$, and the parts carried by the cross-head are reciprocated and motion is imparted from the cam, through the medium of the rack $f'$, to the shafts $h$, downwardly to the blank-table-elevating mechanism, and upwardly to the blank-feeder. The mutilated gear or rack $f'$ and rib $f^2$ are divided into eighths of the pitch of the gear—that is, four separated parts of the rib are carried beyond the pitch-line of the gear. The geared portions mesh with and drive the pinion $h^6$ and the collar $h^5$—that is, the collar $h^5$ having a portion of its periphery removed to produce a flattened part $h^{5\times}$. (See Fig. 11.) The diameter of pinion H is one-eighth of the diameter of the gear $c$ on the feeder C. The collar $h^5$ works intermittently upon the rib $f^2$ of the cam-wheel F, and the pinion $h^6$ works intermittently upon the geared rack $f'$ of the cam-wheel F; hence it will be seen that although the pitch-diameter of the pinion $h^6$ bears the same relation (one-eighth) to the gear or rack $f'$ of the cam-wheel F as pinion H does to the gear $c$ of the feeder C, still two revolutions of the cam-wheel F will be required to communicate, through the pinion $h^6$, shaft $h$, and pinion H, one revolution to the feeder C. The feeder is thus caused to intermittently travel one-half the distance between successive folding mechanisms, and this by a continuously-rotating cam or other mover.

Any suitable folding mechanism proper may be employed in connection with the devices described, and so also may any suitable blank-table-elevating mechanism be substituted for that shown and described in regard to other novel features of my invention, and the same is not limited to their use in connection with the specific folding and blank-table-elevating devices specified.

The folding-box J is provided with the usual folding plates or leaves $j$, which are adapted to fold the flaps of the blank over the body portion, following in their order of operation such a succession as will properly dispose the flaps, the sealing-flap of the blank being necessarily the last to be folded. From each of the two opposite leaves, which fold the flaps on the longer sides of the blank, there extends a connecting-link $j^3$, while from one of the end-flap folders there extends a pivotally-connected rod K. A shaft $k'$ extends through the hinge or pivot of the folding-plate $j$, (see Figs. 13, 14, and 16,) and on this shaft are mounted bevel-gears $j'$. Similar gears are mounted upon shafts connected with the remaining folding-leaves, so that motion is imparted by the lever K, and by said gearing and by the connecting-rod $k^6$ (pivotally secured to the lower end of one crank-arm $k^5$ and to the upper end of a similar crank-arm $k^7$) to all the leaves. Rock-arms $j^2$, projecting from the shafts $k^2$, are connected with and give positive motion to the links $j^3$.

The connecting-rod $k^6$ is provided for the purpose of imparting motion to the shaft $k^3$ from shaft $k'$ as a supplementary device and to insure the absolute accuracy of the relative movements of these two shafts. It is true that the motion is transmitted from $k^3$ to $k'$ by the gearing; but it is impossible to avoid the lost motion resulting from wear whenever this form of transmission of motion is employed. The connection of these shafts by the arm $k^6$ is to insure the compensation for all this lost motion and to keep these arms in the same relative position with regard to one another.

The order of succession in folding-leaves $j$ is as follows: The leaf $j$, to which the rod K is pivotally attached, moves first, the opposite leaf next, the side leaf farthest from the connecting-rod $K^6$ next, and finally the sealing-flap-folding leaf. The proportioning of the pinions and axes surrounding this folding-box are such and the pinions on the ends of the shaft $k'$ and $k^3$ are made just so much larger than those on the ends of the shafts $k^2$ and $k^4$ as to make the folders on said box act in the following manner and order: The end folders move first—that is, they have a start ahead of the side folders before motion begins. The folder opposite the connecting-rod $k^6$ is, however, attached to the rock-arm on its proper geared shaft so low down as to move faster than said folder on the end. The consequence is that when the end folders, which move together, have reached a partial inclination they are overtaken by the side folders, and as there is an edge of the blank extending all around the edges of the end folders the flap on the side-folder catches this edge and carries the end flaps along with the side flap. The sealing-flap folder in the meantime has started from a position farther back and less advanced than any of the other folders, and as it is connected with its proper shaft higher up than its opposite its motion is slower. The consequence is that when the folding has been completed by the other folders the sealing-flap has only received a creasing fold, which is all that is necessary and desirable. By this proportioning of the flaps and the overtaking of the end folders by the side folders the flaps may be successively placed in their proper order and the envelope completed.

M M, Fig. 16, represent wings or leaves which form the bottom of the folding-box upon which the blank rests at the time the flaps are folded. These are in themselves well known and may be operated in any usual well-known manner.

In this instance I indicate one manner of giving the desired movement to the bottom wings or leaves of the folding-box and also a step-by-step movement to the endless carriers for conveying completed envelopes from the machine. These carriers are endless bands $b^2$, carrying spaced fingers $b^3$ and mounted on rollers or pulleys $b$. Gears $b'$ (see dotted lines, Fig. 16) are mounted on the shafts of pulleys $b$ and project toward each other, so as to mesh with a rod N, having a rack N' and provided with links $N^2$, extending to crank-arms $N^3$ on the shafts M' of the wings M. A reciprocation of the rack N' is produced by a rocking lever $N^4$, (see dotted lines, Fig. 2,) pivoted in the frame A and projecting into an additional track $N^5$ of the cam F. A similar track $N^6$ (see dotted lines, Fig. 10) and similar connecting devices (not shown) may be employed for reciprocating the rod K, thereby operating the flap-folding leaves. The motion of the pulleys $b'$ is transmitted to the pulleys bearing the belt by means of a simple pawl and ratchet-wheel attachment at the end of the shaft of the latter, as shown in the drawings, whereby the motion of the rack in one direction, preferably the downward, is transmitted by the pawl, but the motion in the opposite direction is not carried from one pulley to the other, as the pawl is inoperative. The end of the rod N is prolonged, as shown in Fig. 2, at the right to connect with the link $N^2$, which is pivoted thereto and to the folding-flap to operate the latter.

In Figs. 15 and 16 I have illustrated a mode and means of applying gum to the pickers, and it comprises openings $j^4$ of a shape substantially agreeing with the pickers and slightly larger, through which, as the folding-piston enters the box J, the pickers are forced and come in contact with a band $j^6$, which is wound upon spring-rollers $j^5$, similar to those in use upon window-curtain rollers. Any suitable mechanism, such as a cord $j^\times$, extending from the band to an adjacent movable part of the machine—as, for example, the rod K, (see left of Fig. 12)—may be used to unwind the same from the roller $j^5$, which, being spring-actuated in an opposite direction, serves to wind the band thereon. The roller is arranged in a compartment which is adapted to contain suitably-prepared gum, so that the band becomes coated and saturated therewith and a sufficient quantity is transferred to the pickers when they come into contact therewith. It is understood, however, that as regards other novel features of my invention they are not in any manner limited to the particular gumming mechanism just described—as, for example, (see Fig. 1,) the pickers may be passed over and in contact with any suitable gumming devices arranged in their circuit and in a horizontal plane in which they move. Such gumming devices may consist of brushes L, supplied in any suitable manner with gum, or, as is common in the art, the gum may be supplied to the picker from a roller arranged in or supplied from any suitable gum-receptacle.

The operation of my invention is as follows: Blanks are placed upon the tables I, and power being applied to the shaft Z the cam-wheel F is rotated constantly, and while it makes one-fourth of a revolution it causes the cross-head E to descend, also the levers $a'$, which bear upon the pistons $c^3$ and the pickers $c^2$, causing them to take up an envelope-blank from each pile. The cross-head E then returns to its highest position and rests while the cam is making another one-fourth of a revolution. During each pause (by means of the compound pinion H $h^6$ and collar $h^5$) the feeder C, to which the pickers are attached, is moved one-eighth of a circle, carrying the four blanks which it has taken, and these are brought over the four folding-boxes. The cross-head E now comes down again, this time forming four envelopes and causing the pickers on the feeder to take up four more, and the operation is continued. Simultaneously with the forming of the envelopes by the depression of the cross-head and the pistons $d^{3\times}$ the pickers $c^2$ pass from where the blanks have just been taken by the folding-pistons into the gum-serving box or receptacle and receive a new supply of gum. Now it will be noticed that the distinctive mode of operation involved in the mechanism hereinbefore described and illustrated consists in providing a blank-feeder which has but a simple movement—viz., an intermittent rotary movement—and which has no vertical or other reciprocatory movement. So, also, in regard to the folding-pistons, they partaking of no rotary motion whatever, either intermittent or continuous, and yet by the co-operation of the feeder shown and described they are properly served with blanks upon which to operate. It is apparent, therefore, that the main objects of the invention, as hereinbefore indicated, are secured and that the product of the machine is increased without the adoption of mechanisms involving undue momentum of the parts in operation or undue complexity in the construction of said parts.

I deem it proper to state that I do not limit my invention in any of its novel features to the exact construction hereinbefore shown and described, but reserve the right to amend, add to, or subtract from the details of construction in any manner and to any extent within the scope of the mechanical skill of persons conversant in the use and manufacture of the class of machines to which this my invention relates, and it is understood that in my claims the words "substantially as specified" following the word "mechanism" or "mechanisms" mean that any well-known mechanism, although different from that shown and described, which is adapted to accomplish the same purpose may be employed.

What I claim is—

1. In an envelope-machine, the combination of non-rotatable reciprocative folding-pistons and a non-reciprocative intermittently-rotative blank-feeder, substantially as specified.

2. In an envelope-machine, the combination of a series of blank-folding mechanisms, substantially as specified, an alternately-disposed series of blank-supporting mechanisms, substantially as specified, a non-rotatable series of folding-pistons arranged above the said folding mechanisms, and an intermittently-rotatable blank-feeder, substantially as specified.

3. In an envelope-machine, the combination of alternately-arranged folding and blank-supporting mechanisms, substantially as specified, a non-rotatable series of folding-pistons carried by a vertically-reciprocative frame having registering projections, and an interposed intermittently-rotative blank-feeder having registering grooves, substantially as specified.

4. In an envelope-machine, the combination of a frame-work provided with a fixed bed having arranged alternately thereon folding mechanisms and blank-supporting mechanisms, substantially as specified, a non-reciprocative intermittently-rotatable blank-feeder projecting above and over said bed, a non-rotatable reciprocatory cross-head carrying folding-pistons, a main cam for giving motion to the cross-head, and intermediate gearing for transmitting intermittent motion to the blank-feeder, substantially as specified.

5. In an envelope-machine, and as a means for conveying an intermittent motion to and in combination with the blank-feeder thereof, a broken rack and rib, a gear connected with the feeder, and a compound gear comprising pinions and an intermediate collar adapted to slide along the unbroken portions of the rib, substantially as specified.

6. In an envelope-machine, and as a means for reciprocating the folding-pistons thereof and for intermittently rotating the blank-feeder thereof, the combination of said pistons and feeder, and a cam having a track for giving alternate vertical movements to the folding-piston cross-head and alternate periods of rest to the same, and having also a broken rack for giving intermittent rotation to gearing connecting the blank-feeder with said cam, substantially as specified.

7. In an envelope-machine, and as a means for reciprocating the folding-pistons thereof and for intermittently rotating the blank-feeder thereof, and in combination therewith, a cam having a track for giving alternate vertical movements to the folding-piston cross-head and alternate periods of rest to the same, and a broken rack and rib, an intermediate pinion meshing with the broken rack, an adjacent collar adapted to ride upon the broken rib, a gear connected with the blank-feeder, and a pinion meshing therewith and mounted concentrically and moving with the collar, substantially as specified.

8. In an envelope-machine, the combination of a substantially cylindrical frame-work having a fixed annular bed embracing said frame-work, an annular blank-feeder mounted on the bed, a cam arranged to rotate within the frame-work on a central spindle rigidly mounted therein, a cross-head mounted upon the spindle, rods connecting the cross-head with the cam, and an intermediate guide-frame provided with arms for guiding said rods, substantially as specified.

9. In an envelope-machine, the combination of a non-rotatable reciprocatory cross-head, a non-reciprocatory intermittently-rotatable blank-feeder having pickers, a system of picker-operating levers connected at their inner ends by a collar with a central spindle upon which the cross-head reciprocates, and a spring arranged between said collar and said cross-head, substantially as specified.

10. In an envelope-machine, a non-reciprocatory intermittently-rotatable blank-feeder having a series of openings for the passage of folding-pistons and having at each opening yieldingly-supported gum-pickers, substantially as specified.

11. In an envelope-machine, a blank-feeder having a cylindrical body, a projecting flange provided with a series of openings for the passage of folding-pistons therethrough, and yieldingly-supported pickers arranged at each of the openings and having a gear connected with the body for the rotation of the feeder, substantially as specified.

12. In an envelope-machine, a blank-feeder having a cylindrical body portion provided with a gear for its rotation and vertical ribs or grooves and a flange provided with openings and pickers, in combination with vertically-reciprocative folding-pistons and supporting-rods which are provided with registering projections adapted to take into the grooves or ribs of the body of the feeder, substantially as specified.

13. In an envelope-machine, the combination of a series of non-rotatable reciprocatory folding-pistons, a non-reciprocative blank-feeder having twice the number of openings that there are folding-pistons, a series of folding mechanisms, substantially as specified, and blank-supporting mechanisms, each equal in number with the folding-pistons, a cam for reciprocating the pistons, and an intermediate gearing connecting the cam and the feeder to intermittently rotate the feeder one-half the distance between the said folding-pistons, substantially as specified.

14. In an envelope-machine, and in combination with the folding mechanism thereof, a non-rotatable reciprocative folding-piston, a non-reciprocative intermittently-rotating blank-feeder having a series of openings each provided with yieldingly-supported pickers, and picker-gumming mechanism, substantially as specified, arranged in the path of the pickers, substantially as specified.

15. In an envelope-machine, and in combination with the blank-supporting table thereof and with the threaded standards and geared nuts for lifting the said table, a pinion for operating said geared nuts, a disk for operating said pinion, and a friction-pulley adjustably mounted on a shaft to bear upon said disk, substantially as specified.

16. In an envelope-machine, and in combination with the blank-supporting table and with the threaded standard and geared nut for lifting the said table, a pinion for operating said geared nut, a disk for operating said pinion, and a friction-pulley adjustably mounted on the shaft adjacent to said disk, substantially as specified.

17. In an envelope-machine, the combination of a main cam, reciprocating folding-pistons, an intermittently-rotatable blank-feeder, folding mechanisms, and blank-supporting tables, with gearing interposed between the feeder and cam and connected with said feeder and the blank-supporting-table operating mechanism, and means, substantially as described, for rotating the cam, substantially as specified.

18. In an envelope-machine, the combination of the cylindrical frame-work having an exterior overhanging table provided with an annular groove and a blank-feeder having a cylindrical body portion, an outwardly-projecting flange, and adapted to ride in the groove on said table, substantially as specified.

19. In an envelope-machine, a gum-receptacle arranged adjacent to the folding-box and having an opening in its top substantially conforming to the shape of a picker, in combination with said picker, whereby a picker may be introduced into the opening to be supplied with gum, and whereby the upper surface of the receptacle prevents the contact of a blank with the gum therein, substantially as specified.

20. In an envelope-machine, a gum-receptacle provided with an endless band and with means, substantially as described, for giving movement to the same, in combination with the folding-box, the blank-feeder carrying blank-pickers and picker-depressing pistons, and means for operating said blank-pickers and picker-pistons, substantially as specified.

21. The combination, with end-flap-folding leaves and side-flap-folding leaves, the former mounted on shafts provided with pinions at their ends and the latter connected by links to geared shafts running parallel therewith, whereby motion imparted to one of the end-flap-folding leaves is conveyed to the remaining leaves, substantially as specified.

22. The combination, with the end and side flap folding leaves, of shafts having pinions thereon, said shaft connected one with each leaf, and a connecting-rod $k^6$, and cranks operatively connected with opposite shafts, whereby lost motion is overcome, substantially as specified.

23. In an envelope-machine of the class described, a cylindrical frame having an annular table, in combination with a centrally-located gearing for giving motion to the operating devices supported by the frame and its table, substantially as specified.

24. The combination of a cylindrical frame having an annular table, a cylindrically-flanged blank-feeder, a concentrically-located main motion-conveying cam-gear, and pinions for imparting motion to said feeder, substantially as specified.

In testimony whereof I affix my signature in presence of two witnesses.

RANDOLPH G. WARD.

Witnesses:
   E. B. STOCKING,
   HEATH SUTHERLAND.